(12) United States Patent
Stepetic et al.

(10) Patent No.: US 6,559,406 B2
(45) Date of Patent: May 6, 2003

(54) AIR FEED WELD GUN WITH RETRACTABLE PISTON

(75) Inventors: Bruce R. Stepetic, Warren, MI (US); Brian M. Wilkins, Macomb County, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/954,850

(22) Filed: Sep. 18, 2001

(65) Prior Publication Data

US 2003/0052093 A1 Mar. 20, 2003

(51) Int. Cl.$^7$ .................................................. B23K 9/20
(52) U.S. Cl. ............................................ 219/98; 219/99
(58) Field of Search ............................. 219/98, 99, 95, 219/97

(56) References Cited

U.S. PATENT DOCUMENTS

| | | | |
|---|---|---|---|
| 2,522,341 A | | 9/1950 | Brus |
| 2,533,483 A | | 12/1950 | Losquadro |
| 2,568,242 A | | 9/1951 | Matteson, Jr. |
| 2,762,022 A | | 9/1956 | Benander et al. |
| 3,526,744 A | * | 9/1970 | Erlich .......................... 219/98 |
| 3,701,878 A | | 10/1972 | Hinden et al. |
| 3,762,541 A | | 10/1973 | Hinden et al. |
| 3,835,285 A | | 9/1974 | Hinden et al. |
| 4,002,876 A | * | 1/1977 | Wieland, Jr. .................. 219/98 |
| 4,562,328 A | * | 12/1985 | Shoup .......................... 219/98 |
| 5,349,152 A | * | 9/1994 | Renner ..................... 219/117.1 |
| 5,808,264 A | * | 9/1998 | Stepetic et al. ................ 219/98 |

* cited by examiner

*Primary Examiner*—M. Alexandra Elve
*Assistant Examiner*—Len Tran
(74) *Attorney, Agent, or Firm*—Harness, Dickey & Pierce, P.L.C.

(57) ABSTRACT

A blow feed weld gun for welding a nut to a metal substrate is disclosed. The blow feed weld gun has an air feed mechanism and a nut drive mechanism. The nut drive mechanism contains a primary piston assembly located within a cylindrical working chamber. The primary piston assembly is coupled to a first driven piston which is hollow and defines a passage which welding gasses and/or air can be delivered to the threads of a threaded weld nut.

20 Claims, 8 Drawing Sheets

AIR FEED WELD GUN WITH RETRACTABLE PISTON

FIELD OF THE INVENTION

The present invention relates to an automatic drawn arc welding apparatus for securing nuts to metal surfaces and, more particularly, to an air feed weld gun with retractable piston that has a dual piston mechanism for supplying welding gasses and/or air to the nut hole during the welding operation.

BACKGROUND OF THE INVENTION

Traditionally, weld nut guns have a collet. The spring forces in a slit collet hold a weld nut during the welding operation. Often, weld spatter from the welding process coats the threads on a weld nut, leading to significant cost and time loses due to component rework.

To date, automatic feed weld guns which provide a supply of welding gasses to the threads of the nut during the welding process have proven relatively successful. As shown in FIG. 1, these prior weld guns 15 utilized a primary piston assembly 16 which is driven within a cylindrical working chamber 17. The primary piston assembly 16 drives a hollow first driven piston 18. The prior art weld gun 16 utilizes several sealable passages 19 to provide welding gasses through the hollow first driven piston. To effectuate sealing off of the through passages 19, the primary piston assembly 16 utilizes a second fixed piston 20 disposed through the primary piston assembly 16. Disposed between the primary piston assembly 16 and the fixed piston 20 is a series of seals 21. Over time, these seals 21 have the tendency to leak, thus allowing compressed welding gasses from the air supply 22 to enter the back portion 23 of the working chamber 17. This inhibits the ability of the primary piston assembly 16 to return to its fully retracted position within the cylindrical working cavity 17.

SUMMARY OF THE INVENTION

A need, therefore, exists for an apparatus and system which can automatically feed a weld fastener such as a nut or a stud to a welding surface. The apparatus provides welding gasses to the threaded portion of the weld nut to minimize the chance that weld spatter material will be incorporated into the threads. A need further exists for an automatic feed weld gun with an improved return feature which is resistant to degradation caused by cycling of the weld gun.

In one preferred embodiment, a blow feed weld gun for welding a nut to a metal substrate is disclosed. The blow feed weld gun has an air feed mechanism and a primary piston assembly. The primary piston assembly contains a primary piston assembly located within a cylindrical working chamber. The primary piston assembly is coupled to a first driven piston which is hollow and defines a passage which welding gasses can be delivered to the threads of a weld nut. Slidably disposed adjacent the first driven piston is a second interior piston. A second interior piston, which is coupled to the primary piston assembly, regulates gasses through an axial bore of the first driven piston.

In yet another preferred embodiment, the second interior piston is disposed within the passage of the first driven piston. Movement of the second interior piston is regulated by a pin which engages a slot formed within the first driven piston.

In yet another preferred embodiment, the regulating pin of the second interior piston engages a forward wall of the cylindrical working chamber to affect the timing of release of welding gasses into the passage of the first driven piston.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
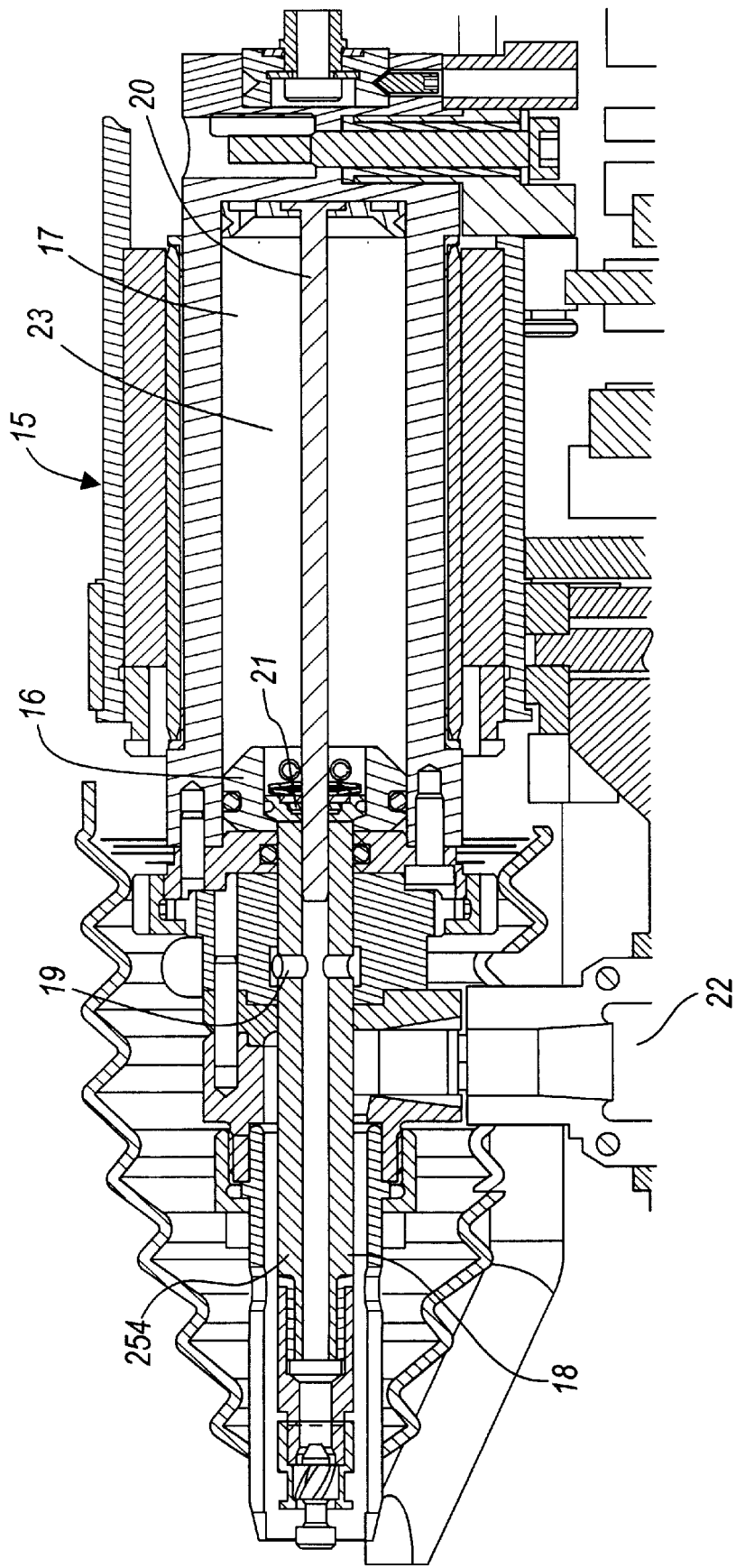
FIG. 1 represents a blow feed weld gun according to the prior art.
Figure 2:
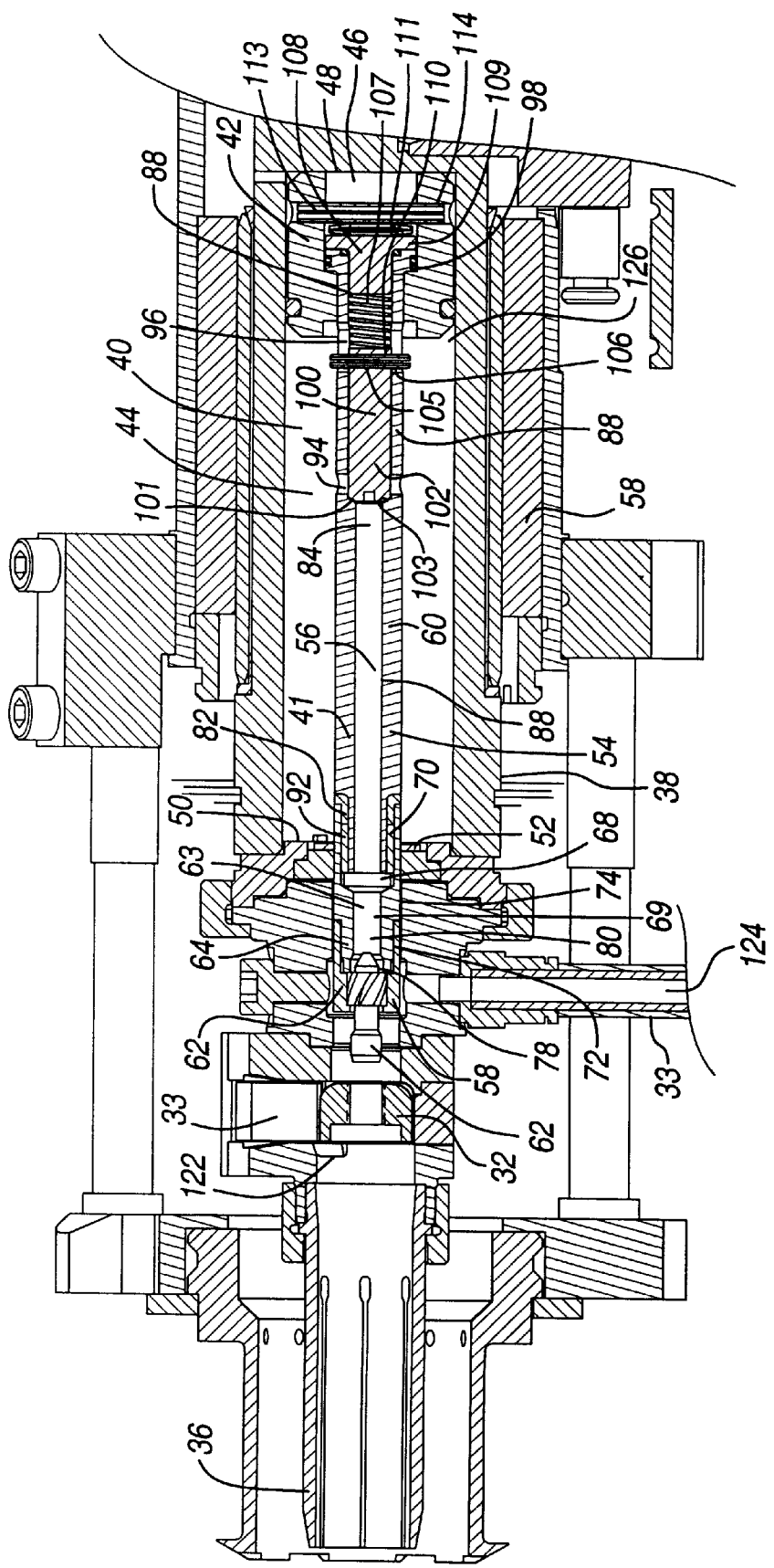
FIG. 2 is a cross-sectional view of the blow feed weld gun of the present invention with its primary piston assembly in a fully retracted position.

FIG. 2 discloses a blow feed weld gun 30 for welding a nut 32 to a metal substrate. The blow feed weld gun 30 has an air feed mechanism 33 and a drive mechanism 41, which drives the nut 32 into the welding collet 36. The drive mechanism 41 is formed by an outer sleeve 38 which defines a cylindrical working chamber 40 axially disposed with respect to the collet 36. The drive mechanism 41 further has a primary piston assembly 42 disposed within the cylindrical working chamber 40. The drive mechanism 41 defines a first working chamber 44 and a second working chamber 46, separated by the primary piston assembly 42, between a rear wall 48 and a forward wall 50. Defined within the forward wall 50 is a bore 52 which accepts a first driven piston 54. Disposed through the first driven piston 54 is an axial, bore 56. The first driven piston 54 is comprised of a fastener driver in the form of a fluted tip retainer 58 which engages the nut 32 and a body portion 60.

The fluted tip retainer 58 is comprised of a fluted tip 62 which circulates pressurized air about the threads of the nut 32, and an insert piston extension 64. The fluted tip 62 has a defined fluted tip through bore 63 and an interior radius 68, and threaded portion 70. The insert piston extension 64 has a threaded first exterior radius 72, second exterior radius 74, and weldment base through bore 76 fluidly coupled to the fluted tip through bore 63. The insert piston extension 64 defines a first interior radius 78, second interior radius 80, and third interior radius 82 which also has a defined interior thread. The first of driven pistons 54 body portion 60 has a defined axial through bore 84. The body portion axial through bore 84 defines a first internal radius 86, second internal radius 88, and third internal radius 90. A polymer insulating portion 92 is disposed between the body portion 60 and the fluted tip retainer 58 and functions to electrically isolate the fluted tip portion from the rest of the blow feed weld gun 30.

The body portion 60 further defines a transverse through air passageway 94 and defined through slots 96 and mounting flange 98 which functions to mount the first driven piston 54 to the primary piston assembly 42.

Disposed within the second internal radius 88 of the body portion axial bore is the second interior piston 100. A second interior piston 100 is slidably moveable from a first closed position 102 to a second open position 104 (see FIG. 8). In the closed position 102, a second interior piston 100 functions to close the transverse through air passageway 94. In the open position 104, the second interior piston 100 allows air or welding gasses to pass through the transverse through air passageway 94 into the body portion axial bore 84.

The second interior piston 100 further defines a through passage 105 which accepts a pin 106 therein. The pin 106 is further disposed within the defined through slots 96 of the body portion 60, and allows the second interior piston 100 to move from its first closed position 102 to its open position 104. The pin 106 acts as a mechanism to move the second interior piston 100 with respect to the working chamber 40. The pin further engages the forward wall 50 as will be described later.

Further defined within the body portion axial bore is a spring member 107 which axially engages the rear portion 110 of the second interior piston 100. Disposed on the opposite end of the spring 107 is the flanged piston plug 108 which couples the spring member to the primary piston assembly 42. The flanged piston plug 108 has a defined base 109 which functions to stabilize the flanged piston plug 108 within the primary piston assembly 42. The flanged piston plug 108 further has a body portion 100 having a circumference approximately equal to the circumference of the second drive piston 100. The body portion 100 is further disposed within the second internal radius 88 of the body portion axial bore 84. The flanged piston plug 108 functions to compress spring 107 between the flanged piston plug 108 and the second interior piston 100. This enables the spring to normally bias the second interior piston 100 into its closed position 102 as defined by the pin 106 in the defined through slot 96. The first interior piston 100 has a bearing surface 101 which engages seat 103 defined axial bore 56.

Immediately adjacent to the base 109 of the flanged piston plug 108 is a plurality of spring washers 111 which function to bias the flanged piston plug 108 in a first forward position 112. The spring washers 111 are held in place by a through pin 113 disposed through a transverse through passage 114 defined in the primary piston assembly 42.

Referring generally to FIG. 2, which shows the primary piston assembly 42 of the blow feed weld gun 30 in its fully retracted position, air pressure has been introduced into the first working chamber 44 through air passage 120. In this position, a nut 32 is feed into the receiving portion 122 by the air feed mechanism 33. As can be seen, air or welding gas pressure coming through the air supply line 124 is generally blocked by the primary piston assembly.

Figure 3:
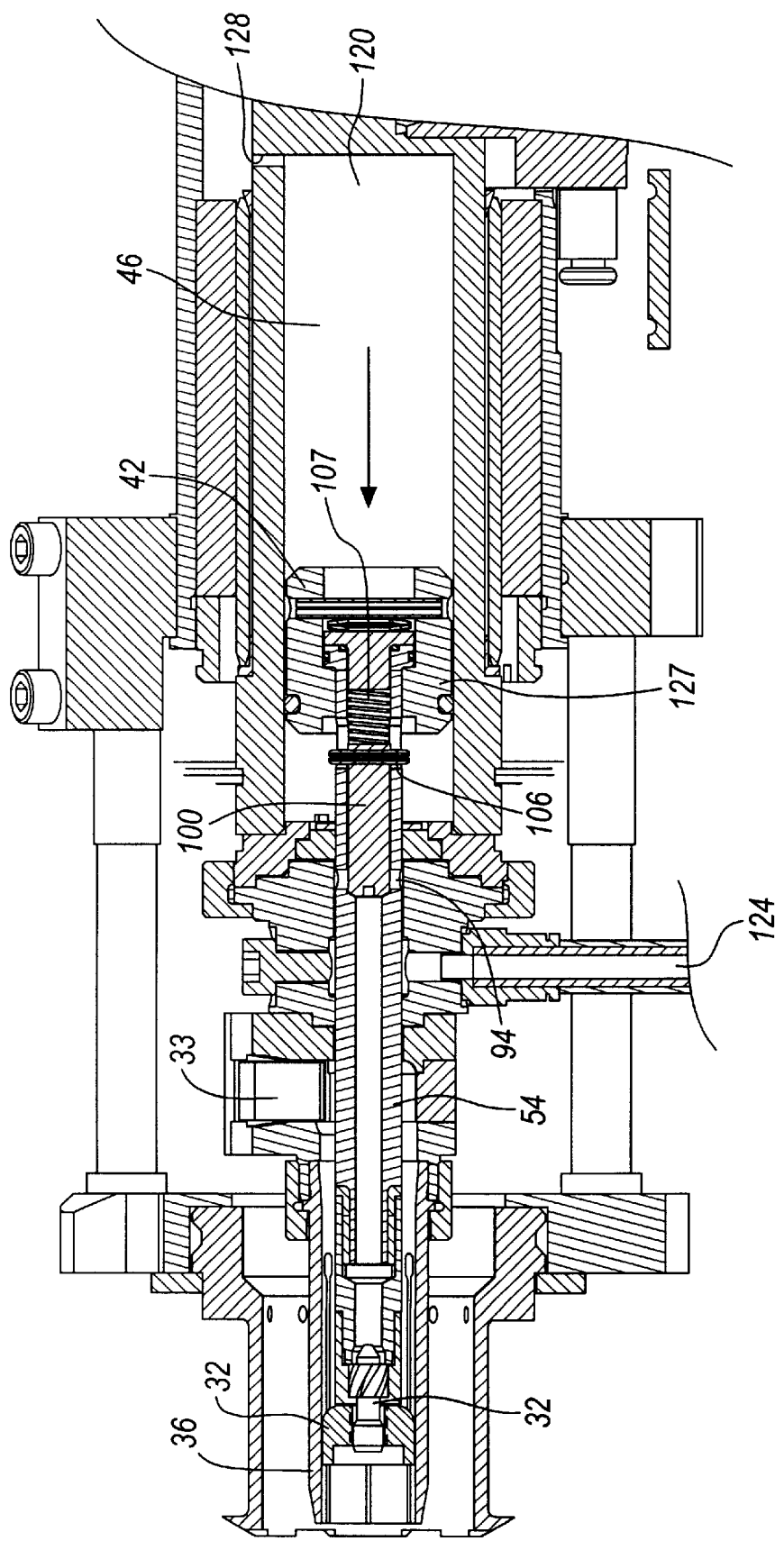
FIGS. 3 and 4 represent cross-sections of the blow feed weld gun according to the present invention with the primary piston assembly in intermediate positions.

FIG. 3 depicts the fluted tip 62 of the primary piston assembly 42 engaging the weld nut 32 and forcing it into the weldment collet 36. As can be seen, the primary piston assembly 42 has been moved from a first position 126 to an intermediate position 127 by increasing the amount of pressure in the second working chamber 46. Pressure is delivered into the second working chamber 46. It should be noted that the air feed line 124 is closed off by the first driven piston 54. In the intermediate position 127, the second interior piston 100 is biased into its forward position by spring 107. Pin 106 is biased forward within through slot 96 to position the second interior piston 100 to fluidly seal the transverse through air passageway 94.

Figure 4:
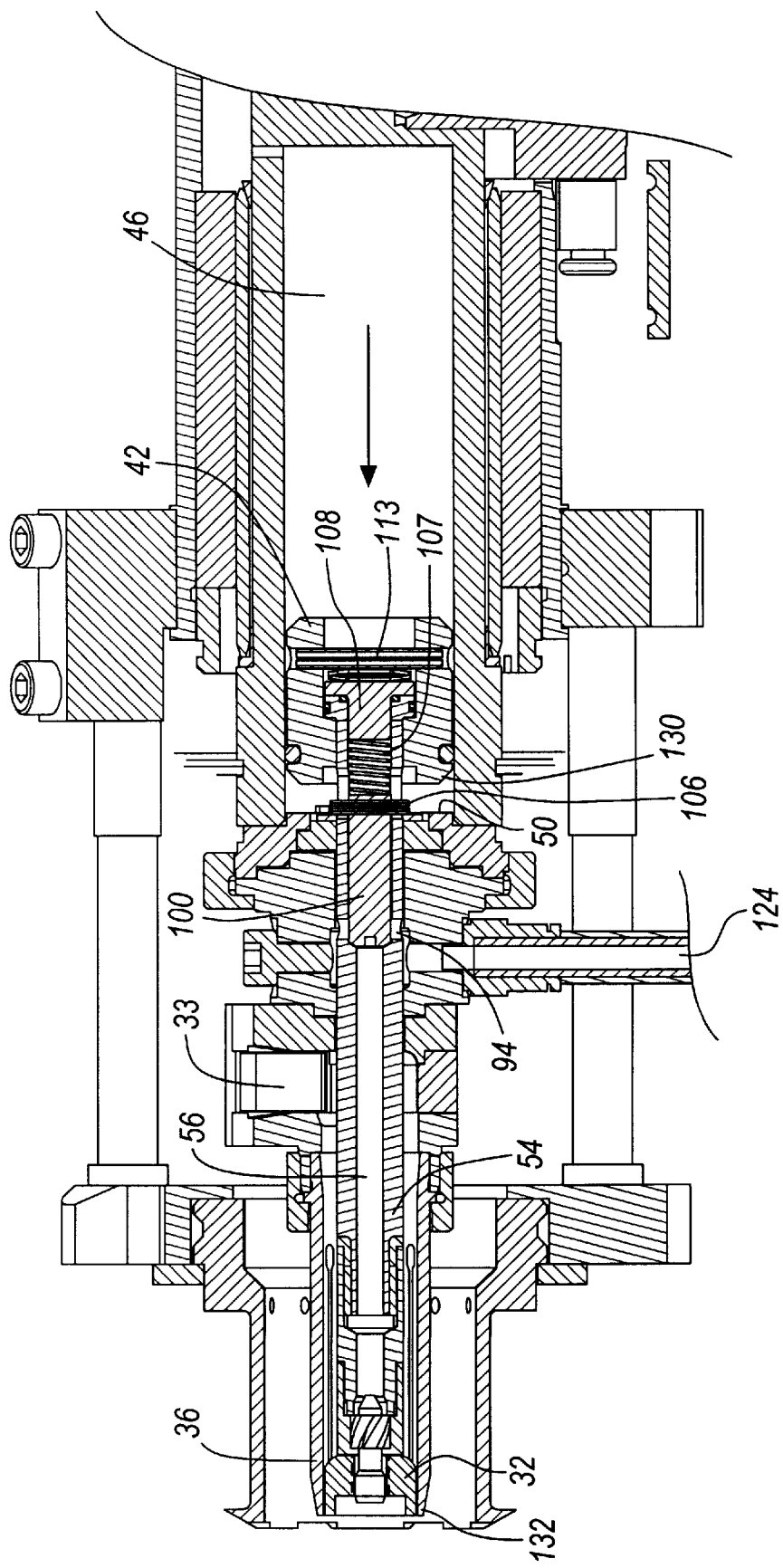

FIG. 4 depicts the blow feed weld gun 30 of the present invention having the primary piston assembly 42 in a second intermediate position 130. In the second intermediate position 130, the pin member 106 engages the forward wall 50 of the cylindrical working chamber 40. The pin 106 functions to stop the forward movement of the second interior piston 100. At this point, transverse through air passage 94 is fluidly coupled to air supply line 124. It should be noted, however, that transverse through air passageway 94 is sealed from the axial bore 56 of the first driven piston 54 by the second interior piston 100.

Figure 5:
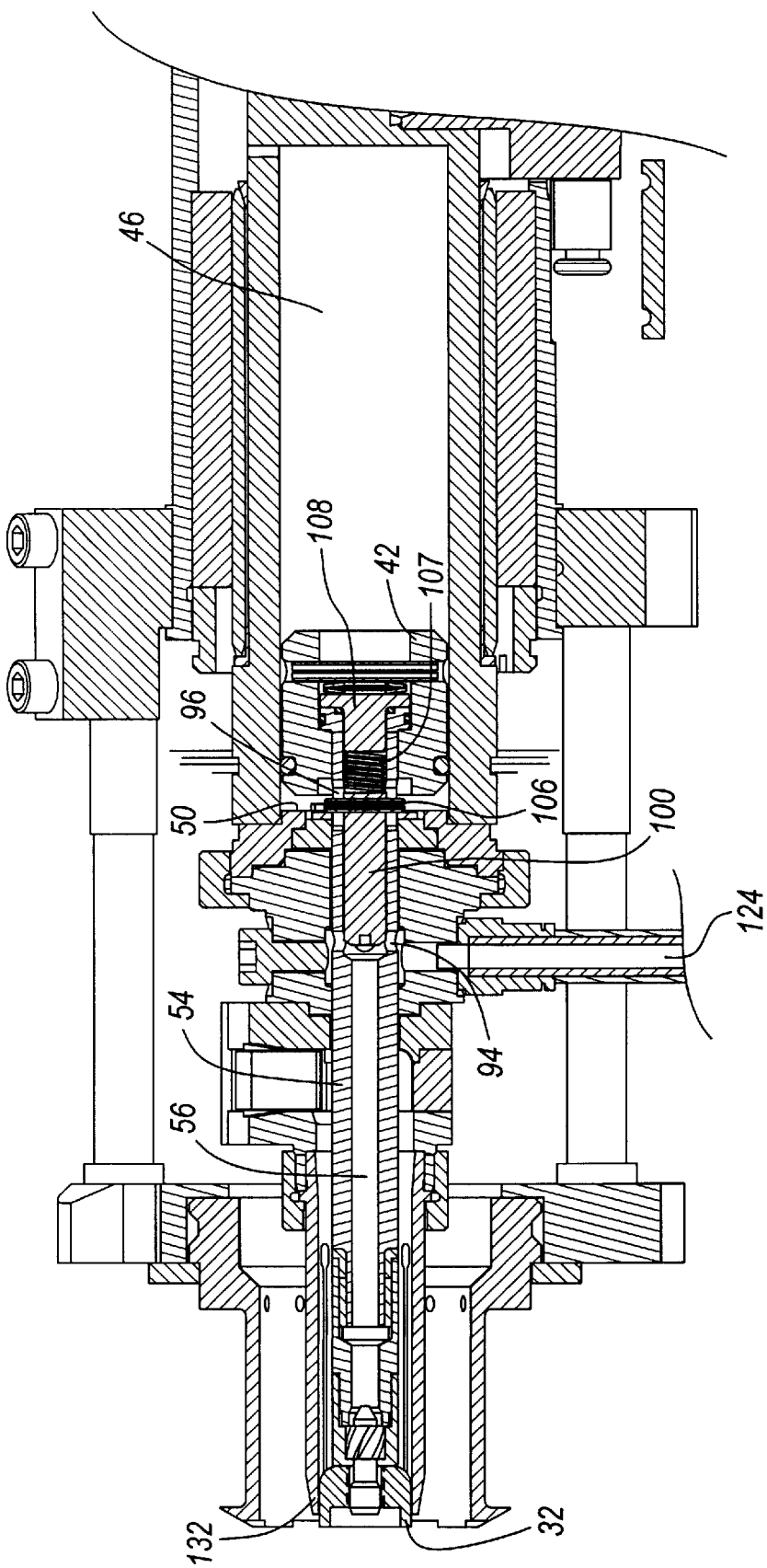
FIG. 5 is a cross-section of the blow feed weld gun of the present invention with the primary piston assembly moving in a forward position.

As is shown in FIG. 5, as the primary piston assembly 42 moves forward toward the forward wall 50, spring 107 is compressed and the first driven piston 54 moves the nut 32 into its forward position. As the first driven piston 54 is being pushed forward by the primary piston assembly 42, the second interior piston 100 is held in place by the interaction of pin 106 on the forward wall 50. At this point, transverse through air passageway 94 is fluidly coupled to both the air supply line 124 and the axial bore 56 of the first driven piston 54.

Figure 6:
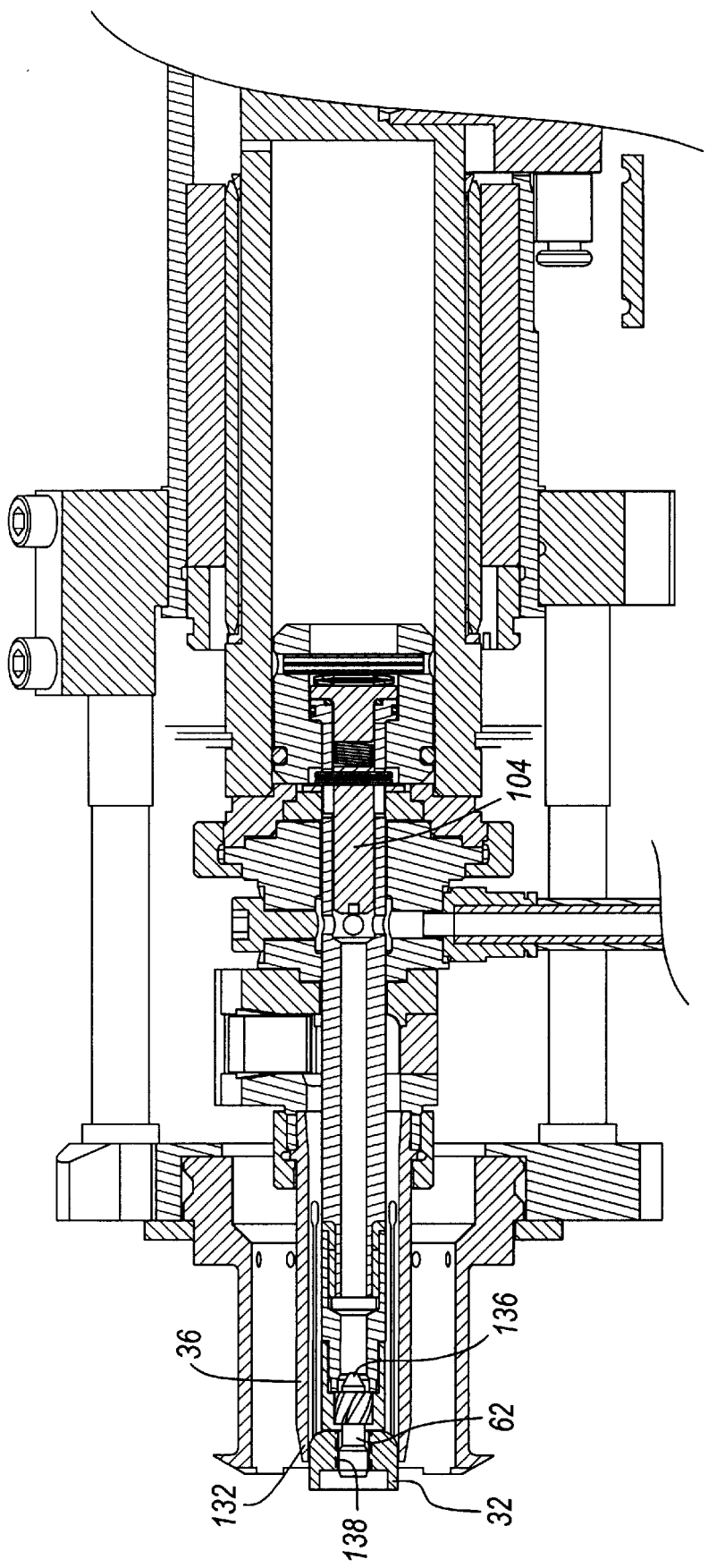
FIGS. 6 and 7 are cross-sectional diagrams of the blow feed weld gun of the present invention with the primary piston assembly in its full forward position.
Figure 7:
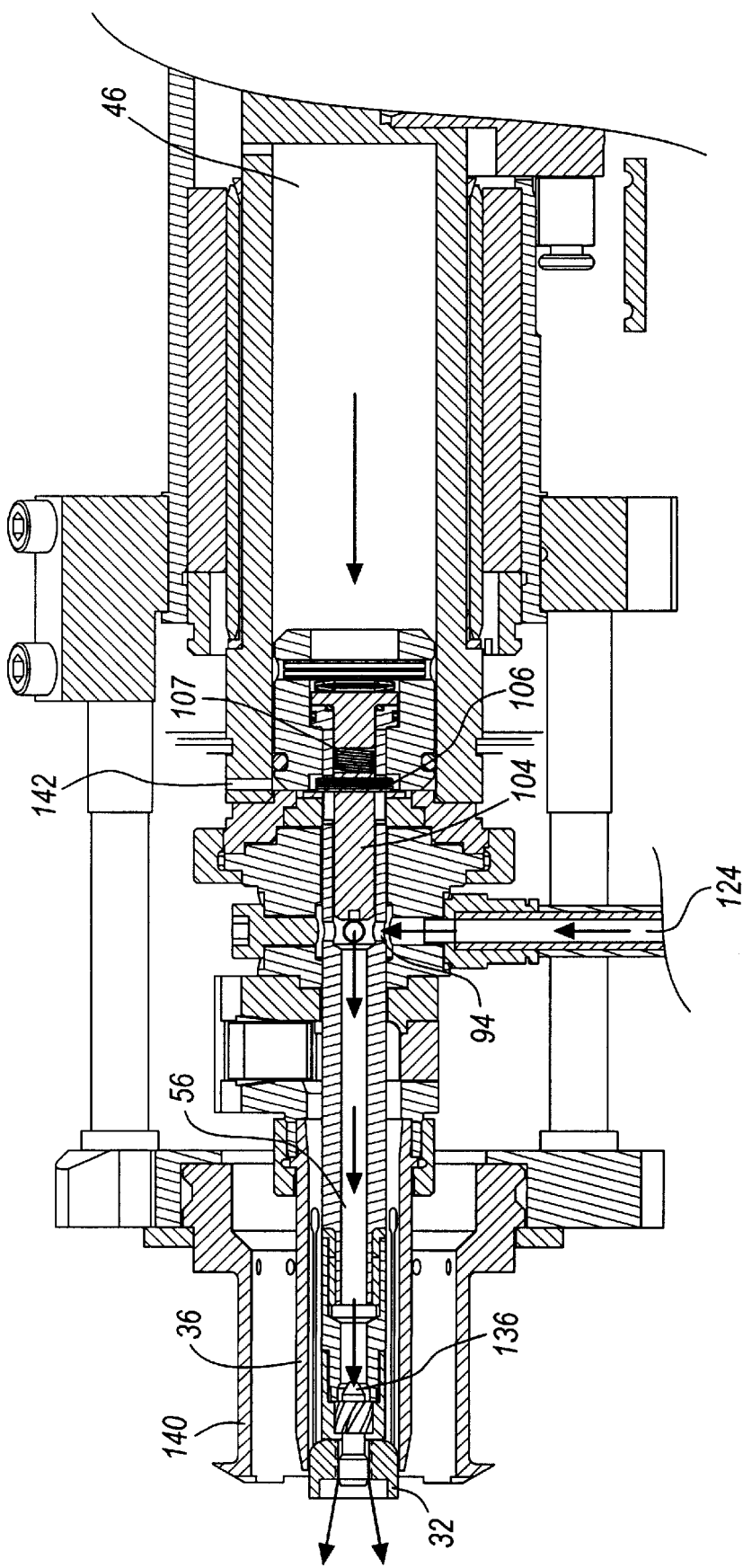

Referring generally to FIGS. 6 and 7, the nut 32 is shown in its fully extended and weld position within the collet 36. The transverse through air passage 94 is fully aligned with air supply 124, allowing an unrestricted passage of the air or welding gas through the axial bore, 56 of the first driven piston 54. A controller (not shown) then activates a valve (not shown), which allows air to travel from the air supply line 124 into the axial bore 56 of the first driven piston 54. As is shown in FIG. 7, the air or welding gas travels down through the axial bore 56 until it reaches a cone member 136 of the fluted tip 62. The cone member and fluted tip 62 function to disperse and circulate the air or welding gas within the threaded portion 138 of the nut 32, thus protecting the threads during the welding process. At this time, full pressure in input into the second working chamber 46. Current is applied to the collet 36 to effectuate welding between the nut 32 and the base material (not shown). During the welding procedure, air or non-combustible gas such as nitrogen, helium, air, or argon are inputted through air supply line 124. It should be noted that the axial bore also may serve to place welding gasses within the shroud 140 of the blow feed weld gun 30.

Figure 8:
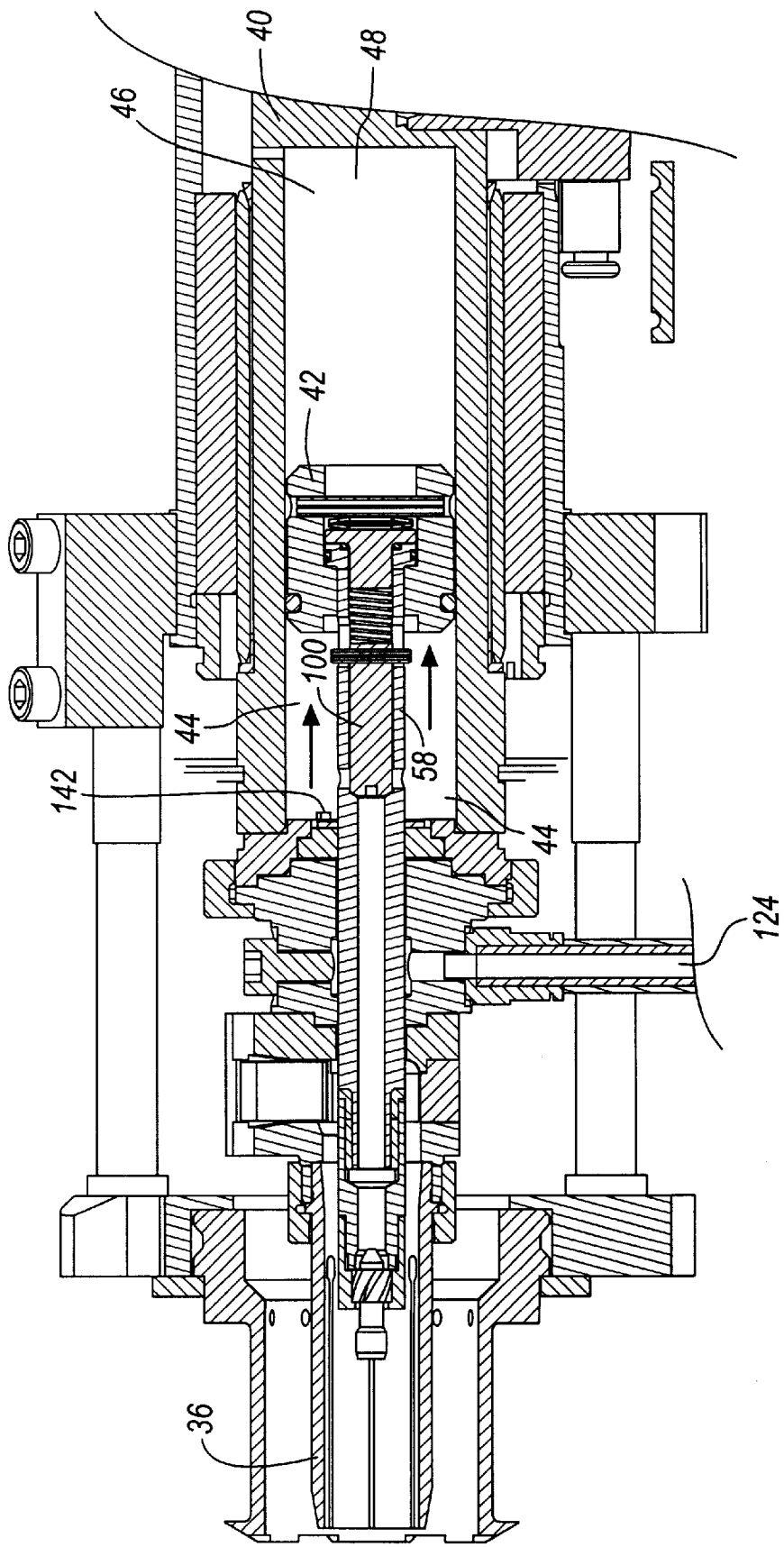
FIG. 8 is a cross-sectional representation of the blow feed weld gun of the present invention showing the primary piston assembly moving in the rearward position.

As best seen in FIG. 8, upon completion of the welding sequence, air pressure is applied through air supply 142 into the first working chamber 44 of the load tube 40. This forces the primary piston assembly 42 backwards away from wall 50, allowing the second interior piston 100 to fluidly seal transverse through air passageway 94, thus closing the fluid connection between the air supply 124 and the axial bore 56. Additionally, the fluted tip 62 is withdrawn from the nut allowing disengagement of the blow feed weld gun 30 from the nut 32. The primary piston assembly 42 travels backwards until it reaches the rear wall 48 of the load tube 40 (shown in FIG. 2).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A blow feed weld gun device for accepting a threaded weld nut from an automatic feeder and welding the nut to a component surface in the presence of welding gasses comprising:

a body defining a working chamber, said working chamber having a front wall defining a bore therethrough;

a primary piston disposed within said working chamber;

a first driven piston coupled to said primary piston and disposed through said front wall bore, said first driven piston defining an axial bore and a fluted tip, wherein said axial bore is fluidly coupled to a gas source when said first driven piston is in a first forward position;

a second member slidably coupled to said first driven piston, wherein said second interior piston is readily movable within said working chamber; and an actuating device which regulates the movement of the second piston to regulate welding gas flow within the axial bore.

2. The blow feed weld gun of claim 1 wherein said second member is a piston slidably disposed within said axial bore.

3. The blow feed weld gun of claim 1 wherein said axial device is an alignment pin coupled to a slot defined by the first driven piston.

4. The blow feed weld gun of claim 1 wherein said first driven piston defines at least one transverse through passage, said transverse through passage is configured to accept welding gasses, and said second member is a piston configured to slidably regulate the flow of gasses through said through passage.

5. The blow feed weld gun of claim 2 wherein said axial bore has a valve seat and said second member has a bearing surface configured to be coupled to said valve seat.

6. The blow feed weld gun of claim 2 wherein said actuating device is a pin which engages said front wall of said working chamber.

7. The blow feed weld gun of claim 1 further comprising a spring disposed between said second member and said primary piston.

8. The blow feed weld gun of claim 2 further comprising a spring disposed between said second member and said primary piston, said activating mechanism being a pin disposed at least partially into said second interior piston, wherein said pin engages said front wall of the working chamber to regulate weldment gasses into said axial bore.

9. A blow feed weld gun device having an automatic threaded fastener feeder comprising:

a body defining a working chamber, said working chamber having a front wall defining a bore therethrough;

a primary piston slidably disposed within said working chamber;

a first driven member coupled to said primary piston and disposed through said front wall bore, said first driven member defining an axial bore, wherein said axial bore is fluidly coupled to a gas source when said first driven piston is in a first forward position;

a second interior piston disposed within said axial bore, wherein said second interior piston is readily movable within said working chamber; and an actuating device which regulates the movement of the second piston to regulate gas flow within the axial bore.

10. The blow feed weld gun of claim 9 wherein said second interior piston is a piston slidably disposed within said axial bore.

11. The blow feed weld gun of claim 9 wherein said axial device is an alignment pin coupled to a slot defined by the first driven piston.

12. The blow feed weld gun of claim 9 wherein said first driven piston defines at least one transverse through passage, said transverse through passage configured to accept the flow of pressurized gasses, and said second to interior piston is a piston configured to slidably regulate the flow of gasses through said transverse through passage.

13. The blow feed weld gun of claim 10 wherein said axial bore has a valve seat and said second interior piston has a bearing surface configured to be coupled to said valve seat.

14. The blow feed weld gun of claim 10 wherein said actuating device is a pin which engages said front wall of said working chamber.

15. The blow feed weld gun of claim 9 further comprising a spring disposed between said second interior piston and said primary piston.

16. The blow feed weld gun of claim 10 further comprising a spring disposed between said second interior piston and said primary piston, said activating mechanism being a pin disposed at least partially into said second interior piston, wherein said pin engages said front wall of the working chamber to regulate gasses into said axial bore.

17. The blow feed weld gun of claim 12 wherein the second interior piston is capable of being positionable in a second position that prevents the flow of gasses through the transverse through passage.

18. The blow feed weld gun of claim 12 wherein the second interior piston is capable of being positionable in a second position that prevents the flow of gasses through the axial bore.

19. The blow feed weld gun of claim 18 further comprising a primary piston actuator which is configured to move the primary piston from a first position to a second position wherein said second interior piston is in the second position when said first primary piston is in the first position.

20. The blow feed weld gun of claim 19 wherein said second interior piston is in the second position when said first primary piston is in the second position.

* * * * *